(12) United States Patent
Tanimoto et al.

(10) Patent No.: US 11,693,611 B2
(45) Date of Patent: Jul. 4, 2023

(54) PRINTING SYSTEM INCLUDING SERVER DEVICE CAPABLE OF COMMUNICATING WITH PRINTERS AND CLIENT DEVICE

(71) Applicant: BROTHER KOGYO KABUSHIKI KAISHA, Nagoya (JP)

(72) Inventors: Satoshi Tanimoto, Nagoya (JP); Kosuke Mori, Handa (JP); Katsunori Enomoto, Toyokawa (JP); Yuqing Liu, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/468,924

(22) Filed: Sep. 8, 2021

(65) Prior Publication Data

US 2022/0100445 A1  Mar. 31, 2022

(30) Foreign Application Priority Data

Sep. 30, 2020  (JP) ................ 2020-164728

(51) Int. Cl.
  *G06F 3/12*  (2006.01)
(52) U.S. Cl.
  CPC ........... *G06F 3/1238* (2013.01); *G06F 3/127* (2013.01); *G06F 3/1222* (2013.01)
(58) Field of Classification Search
  None
  See application file for complete search history.

(56) References Cited

U.S. PATENT DOCUMENTS

| | | | |
|---|---|---|---|
| 8,953,189 B1* | 2/2015 | Agrawal | G06F 3/1288 |
| | | | 358/1.14 |
| 10,162,584 B1* | 12/2018 | Ozawa | G06F 3/1231 |
| 2004/0117389 A1* | 6/2004 | Enami | G06F 3/1292 |
| 2005/0068566 A1* | 3/2005 | Nishiguchi | G06F 3/1204 |
| | | | 358/1.15 |

(Continued)

FOREIGN PATENT DOCUMENTS

| | | |
|---|---|---|
| JP | 2010-244550 A | 10/2010 |
| JP | 2011-056918 A | 3/2011 |

*Primary Examiner* — Henok Shiferaw
(74) *Attorney, Agent, or Firm* — Scully, Scott, Murphy & Presser, PC

(57) ABSTRACT

A printing system includes: a first printer; a second printer; a server device; and a client device. The first printer is configured to perform: receiving first authentication information; accessing, in response to determining that first authentication performed according to a first authentication method is successful, the server device using first account information; receiving, from the server device, a print job stored in association with user identification information included in the first authentication information; printing an image based on the print job. The second printer is configured to perform: receiving second authentication information including the user identification information; accessing, in response to determining that second authentication performed according to a second authentication method is successful, the server device using second account information; receiving, from the server device, the print job stored in association with the user identification information; and printing the image based on the print job.

10 Claims, 6 Drawing Sheets

(56) References Cited

U.S. PATENT DOCUMENTS

| | | | | |
|---|---|---|---|---|
| 2008/0115207 A1* | 5/2008 | Go | ............... | G06F 21/608 |
| | | | | 726/17 |
| 2010/0253975 A1* | 10/2010 | Ida | ............... | G06F 3/124 |
| | | | | 358/1.15 |
| 2016/0103640 A1* | 4/2016 | Tsuchiya | ............... | G06F 3/1285 |
| | | | | 358/1.14 |
| 2016/0306515 A1* | 10/2016 | Hermanson | ............... | G11B 27/036 |
| 2019/0384555 A1* | 12/2019 | Ando | ............... | G06F 3/1285 |

* cited by examiner

FIG. 2

| AUTHENTICATION INFORMATION || FUNCTION SETTING |||
|---|---|---|---|---|
| USER ID | PASSWORD | SHARED PRINT | DIRECT PRINT | STORAGE PRINT |
| USER A | PW A | ○ | ○ | ○ |
| USER B | PW B | ○ | ○ | × |
| USER C | PW C | × | ○ | ○ |

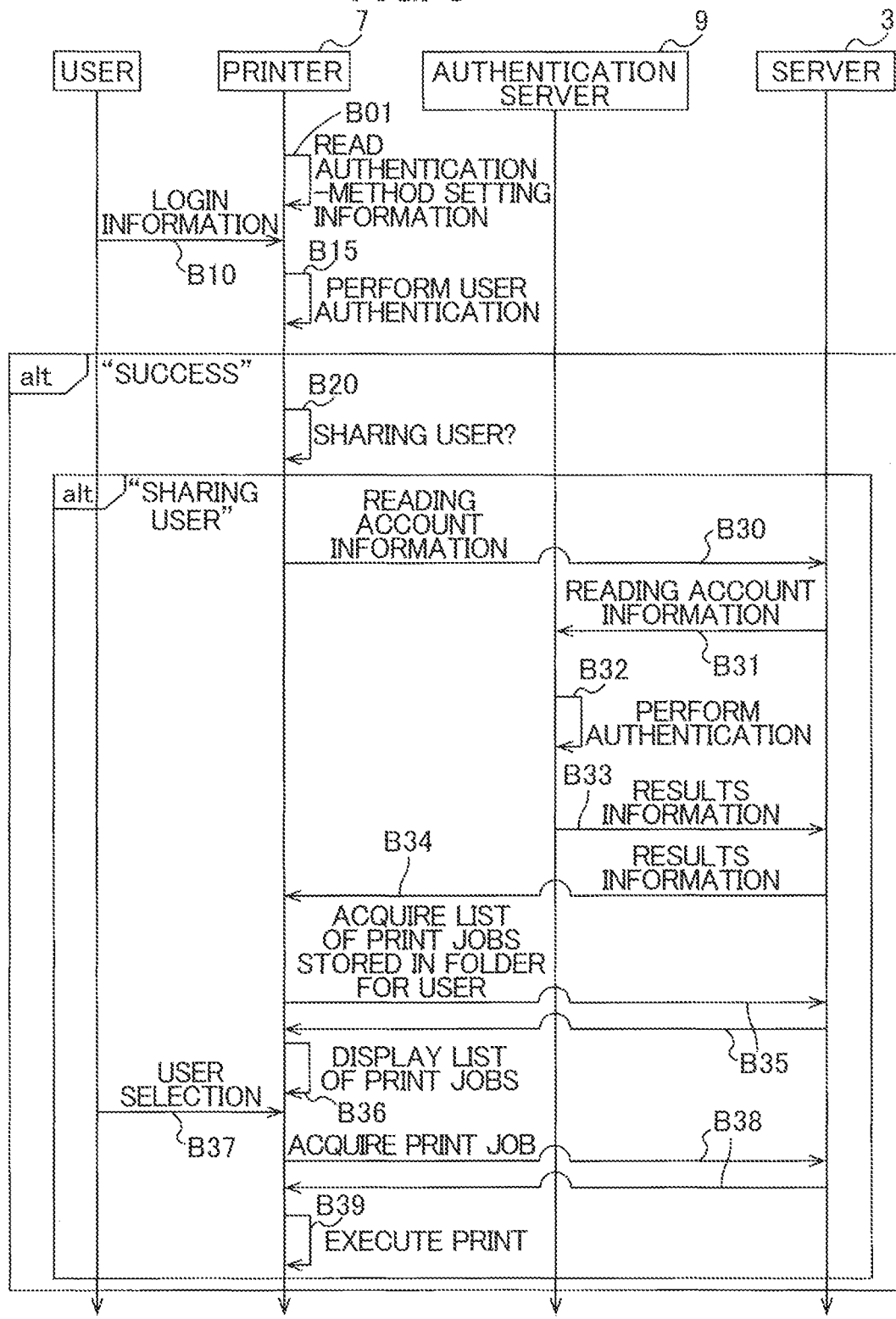

PRINTING SYSTEM INCLUDING SERVER DEVICE CAPABLE OF COMMUNICATING WITH PRINTERS AND CLIENT DEVICE

CROSS REFERENCE TO RELATED APPLICATION

This application claims priority from Japanese Patent Application No. 2020-164728 filed Sep. 30, 2020. The entire content of the priority application is incorporated herein by reference.

TECHNICAL FIELD

The present disclosure relates to a printing system having a server device capable of communicating with printers and a client device, and a printer.

BACKGROUND

A conventional printing system possesses a server device that is connected to a printer and a client device. On one such printing system, the client device stores print jobs on the server device in association with user identification information. When a request for a print job is received from a printer, the server device transfers the print job to the printer. Upon receiving the print job from the server device, the printer performs a printing operation based on the print job.

SUMMARY

The method described for the conventional printing system uses the same authentication server when storing print jobs and when transferring print jobs and consequently has little flexibility in system operations.

In view of the foregoing, it is an object of the present disclosure to increase flexibility in system operations on a printing system having a server device connected to printers and a client device.

In order to attain the above and other objects, the present disclosure provides a printing system. The printing system includes: a first printer; a second printer; a server device; and a client device. The server device is configured to communicate with the first printer and the second printer. The client device is configured to communicate with the server device and includes a client user interface. The client device is configured to perform: (a) transmitting. In a state where first authentication using first authentication information is successful, the transmitting in (a) transmits a print job based on an image to be printed to the server device. The print job is associated with a computer name. The first authentication information is received via the client user interface in advance. The first authentication information includes user identification information. The first authentication is performed according to a first authentication method. The computer name is assigned to the client device. The computer name includes the user identification information. The server device is configured to perform: (b) storing. In response to receiving the print job transmitted from the client device in (a), the storing in (b) stores the print job in association with the user identification information. The user identification information is specified by the computer name associated with the print job. The first printer includes: a first user interface; and a first memory. The first printer is configured to perform: (c) receiving; (d) determining; (e) accessing; (f) receiving; and (g) printing. The receiving in (c) receives the first authentication information via the first user interface. The determining in (d) determines whether the first authentication using the first authentication information received in (c) is successful. The accessing in (e) accesses, in response to determining in (d) that the first authentication is successful, the server device using first account information stored in the first memory. The first account information is used for accessing the server device with a permission to receive the print job. The receiving in (f) receives, from the server device accessed in (e), the print job stored in association with the user identification information. The user identification information is included in the first authentication information received in (c). The printing in (g) prints the image based on the print job received in (f). The second printer includes: a second user interface; and a second memory. The second printer is configured to perform: (h) receiving; (i) determining; (j) accessing; (k) receiving; and (l) printing. The receiving in (h) receives second authentication information via the second user interface. The second authentication information includes the user identification information. The determining in (i) determines whether second authentication using the second authentication information received in (h) is successful. The second authentication is performed according to a second authentication method. The second authentication method is different from the first authentication method. The accessing in (j) accesses, in response to determining in (i) that the second authentication is successful, the server device using second account information stored in the second memory. The second account information is used for accessing the server device with the permission to receive the print job. The receiving in (k) receives, from the server device accessed in (j), the print job stored in association with the user identification information. The user identification information is included in the second authentication information received in (h). The printing in (l) prints the image based on the print job received in (k).

According to another aspect, the present disclosure also provides a printer. The printer includes: a printing engine; a user interface; a communication interface; a memory; and a computer. The memory is configured to store account information. The account information is used for accessing a server device with a permission to receive a print job. The server device is configured to receive a user print job from a client device. The user print job is associated with a computer name. The computer name includes user identification information. The computer name is assigned to the client device. The server device is configured to store the user print job in association with the user identification information. The user identification information is specified by the computer name associated with the user print job. The computer is configured to perform: (a) receiving; (b) determining; (c) accessing; (d) displaying; (e) receiving; (f) receiving; and (g) performing. The receiving in (a) receives authentication information including the user identification information via the user interface. The determining in (b) determines whether an authentication process using the authentication information received in (a) is successful. The authentication process is performed according to a first authentication method. The accessing in (c) accesses, in response to determining in (b) that the authentication process is successful, the server device using the account information stored in the memory. The displaying in (d) displays, via the user interface, the user print job stored in the server device in association with the user identification information included in the authentication information received in (a). The receiving in (e) receives a user selection of a target print job to be printed from among the user print job via the user interface. The receiving in (f) receives, via the communication interface, the target print job based on the user selection received in (e). The performing in (g) performs a printing process to control the printing engine to print an image based on the target print job received in (f).

BRIEF DESCRIPTION OF THE DRAWINGS

The particular features and advantages of the disclosure as well as other objects will become apparent from the following description taken in connection with the accompanying drawings, in which:

FIG. 2 is an explanatory diagram illustrating an example of user information in a printer included in the printing system;

FIG. 6 is a sequence chart illustrating steps in the second procedure executed on the printing system for reading a print job stored on the server and printing the print job on another printer whose authentication method is set to an independent authentication method.

DETAILED DESCRIPTION

Next, a printing system according to one embodiment of the present disclosure will be described while referring to the accompanying drawings. In the printing system according to this embodiment, printers are controlled using personal computers (hereinafter abbreviated as "PC") to execute printing operations.

Figure 1:
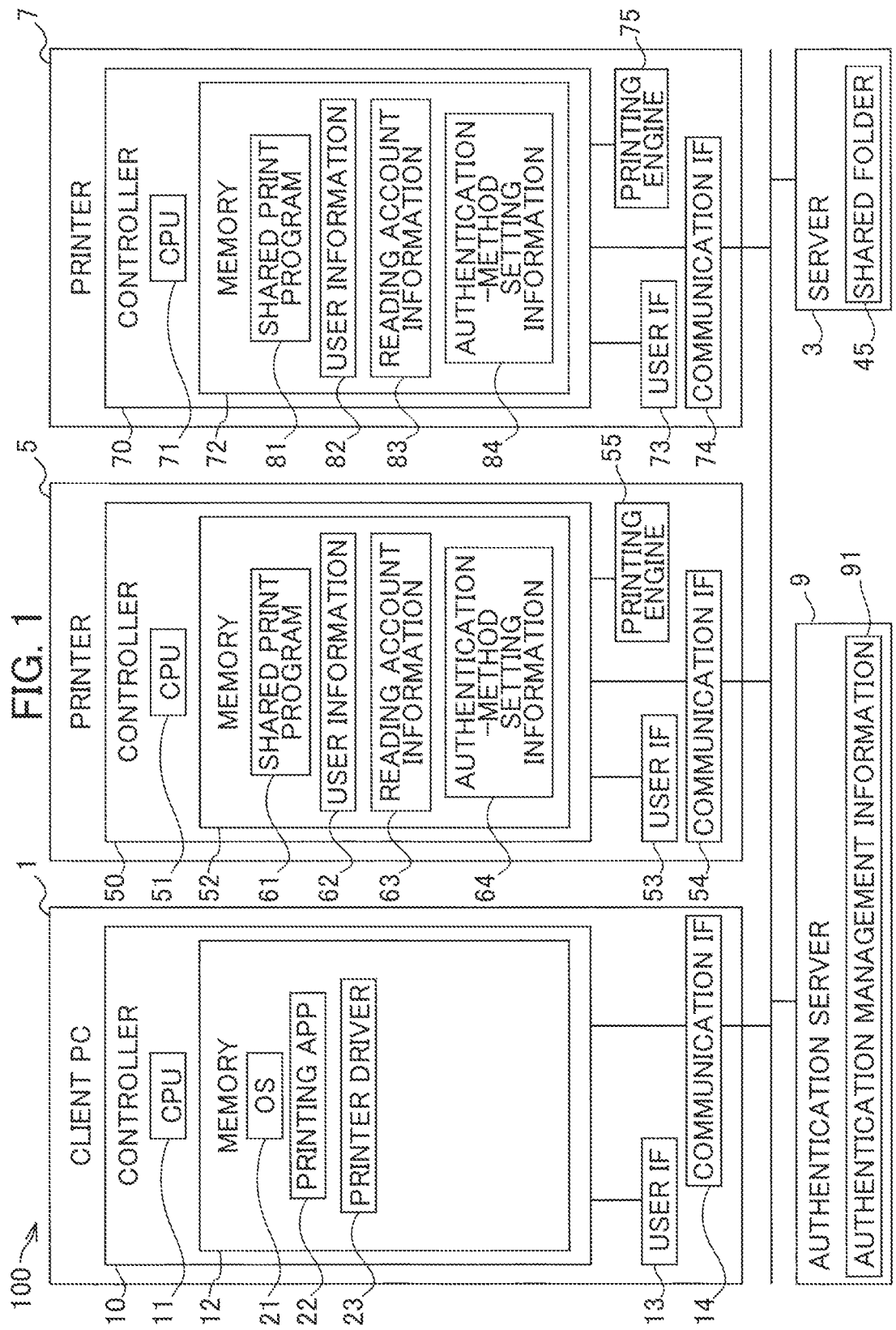
FIG. 1 is a block diagram illustrating an electrical structure of a printing system according to one embodiment of the present disclosure.

FIG. 1 illustrates a printing system 100 according to the present embodiment. The printing system 100 includes a client PC 1, a server 3, a plurality of printers 5 and 7, and an authentication server 9. The client PC 1 is an example of the client device of the present disclosure, and the server 3 is an example of the server device of the present disclosure.

The client PC 1, printers 5 and 7, and authentication server 9 are all connected to and capable of communicating with the server 3. The client PC 1, server 3, and printers 5 and 7 are all connected to and capable of communicating with the authentication server 9. It does not matter whether the client PC 1 can communicate with the printers 5 and 7.

The client PC 1 of the present embodiment at least has a function for receiving a print instruction through a user operation, and a communication function. As illustrated in FIG. 1, the client PC 1 is provided with a controller 10 that includes a CPU 11 and a memory 12. The client PC 1 is also provided with a user interface (hereinafter abbreviated as "user IF") 13, and a communication interface (hereinafter abbreviated as "communication IF") 14. The user IF 13 and communication IF 14 are electrically connected to the controller 10. Note that the controller 10 in FIG. 1 and the controllers of other devices described later are a general concept that covers all hardware and software used for controlling the client PC 1 or the like and does not actually represent a single piece of hardware present in the client PC 1 or the like.

The CPU 11 executes various processes according to programs read from the memory 12 or based on user operations. The memory 12 is a storage area for storing various programs and various data. The programs stored in the memory 12 include a startup program for starting up the client PC 1, and various application programs (hereinafter simply called "app(s)") that use the printers 5 and 7. The data stored in the memory 12 include image data and document data. The memory 12 is also used as a work area for executing various processes.

Examples of a memory in each device such as the memory 12 may be a built-in ROM, a RAM, a hard disk drive, or the like or may be any storage medium that is readable and writable by the CPU 11. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The user IF 13 includes hardware for displaying screens that report information to the user, and hardware for receiving operations performed by the user. The user IF 13 may have a touchscreen that is provided with both a display function and an operation-receiving function for receiving operations or may be a set of devices that include a display provided with a display function and a keyboard, a mouse, a trackball, or the like provided with operation-receiving functions.

The communication IF 14 includes hardware for communicating with external devices such as the server 3 and the like. The communication method of the communication IF 14 may be wired or wireless and may conform to any of various communication standards, such as Ethernet (registered trademark) and Wi-Fi (registered trademark). The communication IF 14 of the client PC 1 may also have a plurality of configurations supporting a plurality of communication standards.

As illustrated in FIG. 1, the memory 12 of the client PC 1 stores various data and various programs that include an operating system (hereinafter abbreviated as "OS") 21, a printing app 22, and a printer driver 23. The OS 21 may be Windows (registered trademark), macOS (registered trademark), iOS (registered trademark), Android (registered trademark), or Linux (registered trademark), for example.

The printing app 22 is used for creating or editing document data or image data, for example, and can receive a print instruction from the user. The printer driver 23 is a program supporting both the printers 5 and 7 and performs various processes for controlling the printers 5 and 7 to execute printing operations. The printers 5 and 7 in the present embodiment are devices of the same model. The printer driver 23 generates print jobs that can be used on both the printer 5 and the printer 7 for executing printing operations. Note that, if the printers 5 and 7 are devices of different models not supported by a common printer driver, the client PC 1 may be provided with one printer driver supporting the printer 5 and another printer driver supporting the printer 7.

The server 3 according to the present embodiment is a device having at least a function for storing print data, and a communication function. As illustrated in FIG. 1, the server 3 is provided with a shared folder 45. The shared folder 45 is a folder made available on a network through a function of an OS installed on the server 3. The shared folder 45 is also accessible from external devices other than the server 3, such as the client PC 1 and the printers 5 and 7. User permissions specifying accessibility may be set for the shared folder 45.

The authentication server 9 is provided with authentication management information 91 and functions to authenticate users based on requests received from the client PC 1, server 3, printer 5, and the like in the printing system 100. The authentication server 9 performs authentication based on the authentication management information 91 and authentication information included with an authentication request received from the above devices and returns results information indicating whether authentication was successful to the device that transmitted the authentication request.

The authentication server 9 performs authentication according to an authentication method using Active Directory (trademark), for example. Authentication information for each user of the printing system 100 is registered in the authentication management information 91. The authentication information includes a user ID for each user. Users of devices in the printing system 100, such as the client PC 1, input authentication information that has been registered for them on the authentication server 9 into the device as login information. The client PC 1 or other device then transmits this login information to the authentication server 9. When the results information subsequently received from the authentication server 9 indicates that authentication was successful, the device accepts the user login.

The printer 5 and printer 7 in the present embodiment are both devices shared by users of the printing system 100. The printers 5 and 7 at least have a function for printing images based on print data, and a communication function.

As illustrated in FIG. 1, the printer 5 is provided with a controller 50 that includes a CPU 51 and a memory 52. The printer 5 is also provided with a user IF 53, a communication IF 54, and a printing engine 55, which are all electrically connected to the controller 50. The CPU 51 is an example of the computer of the present disclosure. The memory 52 of the printer 5 stores various programs and various data, including a shared print program 61, user information 62, reading account information 63, and authentication-method setting information 64.

The user IF 53 is a touchscreen, for example. The touchscreen includes hardware to display screens that report information to the user, and hardware to receive operations performed by the user. Alternatively, the user IF 53 may be a set of components including a screen for displaying information, and input buttons. The communication IF 54 includes hardware to communicate with external devices, such as the server 3 and authentication server 9. The communication IF 54 may employ any type of communication standard and mode of communication.

As illustrated in FIG. 1, the printer 7 has the same configuration as the printer 5. Thus, the printer 7 has a controller 70, a CPU 71, a user IF 73, a communication IF 74, and a printing engine 75 that are equivalent to the controller 50, CPU 51, user IF 53, communication IF 54, and the printing engine 55 in the printer 5. The printer 7 also has a shared print program 81, user information 82, reading account information 83, and authentication-method setting information 84 in the memory 72 that are equivalent to the shared print program 61, user information 62, reading account information 63, and authentication-method setting information 64 in the memory 52 of the printer 5. The memory 72 in the printer 7 also stores the same programs and information as the memory 52 in the printer 5.

The shared print program 61 of the printer 5 and the shared print program 81 of the printer 7 are programs for implementing the shared printing function. Both the shared print program 61 and shared print program 81 function to read print jobs stored in the shared folder 45 on the server 3 and execute printing operations based on the same.

The reading account information 63 in the printer 5 and the reading account information 83 in the printer 7 are account information on users that have read permission for all folders and files in the shared folder 45 on the server 3. For example, the reading account information 63 and the reading account information 83 are information on users having administrator privileges on the printing system 100. As will be described later, the printers 5 and 7 use the corresponding stored reading account information 63 and 83 to read files from the shared folder 45 in the server 3. Here, the reading account information 63 in the printer 5 and the reading account information 83 in the printer 7 may be the same or different information.

The authenticate-method setting information 64 in the printer 5 and the authentication-method setting information 84 in the printer 7 are information specifying the authentication method set for the corresponding printers 5 and 7. Both the printer 5 and the printer 7 can perform authentication according to one of two authentication methods. The first authentication method is the server authentication method for authenticating users using the authentication server 9. The second authentication method is the independent authentication method in which the printer 5 or 7 performs authentication itself without use of the authentication server 9. For example, each of the printers 5 and 7 receives a setting for either the server authentication method or the independent authentication method via the corresponding user IFs 53 and 73 and stores the information specifying the received setting as the corresponding authentication-method setting information 64 and 84. Upon receiving a login operation by the user, the printer 5 or 7 performs user authentication according to one of the authentication methods based on the corresponding authentication-method setting information 64 or 84. The server authentication method is an example of the first authentication method of the present disclosure, and the independent authentication method is an example of the second authentication method of the present disclosure.

The user information 62 in the printer 5 and the user information 82 in the printer 7 are referenced by the corresponding printers 5 and 7 for authenticating a user when the corresponding authentication-method setting information 64 and 84 are set to the independent authentication method. As illustrated in FIG. 2, the user information 82 of the printer 7 includes authentication information 821 and function settings 822, for example. The user information 82 will be described later in greater detail.

The authentication information inputted into the printer 5 or 7 as login information is a set of information comprising a user ID and a password, for example. The user ID is information for identifying an individual user and may be a personal name, an account name, or an employee number for the user, for example. The user ID is an example of the user identification information of the present disclosure. In the present embodiment, the user ID registered in the authentication management information 91 of the authentication server 9 and the user ID stored in the user information 62 and 82 of the corresponding printers 5 and 7 for each user are common information. However, the password may differ among the authentication management information 91 and user information 62 and 82. Note that the reading account information 63 and 83 stored in the corresponding printers 5 and 7 are both authentication information registered on the authentication server 9.

The printers 5 and 7 in the present embodiment are devices that possess a plurality of functions, including a shared printing function according to the shared print programs 61 and 81. The shared printing function is an example of the specific function of the present disclosure. Examples of the other plurality of functions are a duplex printing function, an N-up printing function, a cloud printing function, a direct printing function, and a storage printing function. The cloud printing function acquires image data from the Internet and prints the image data. The direct printing function is used to acquire image data from a USB memory or other memory inserted into the printer itself and execute a printing operation based on the same. The storage printing function temporarily stores an acquired print job in the memory 52 or 72 of the printer 5 or 7 and execute a printing operation based on the print job after receiving a user instruction through the corresponding user interfaces 53 and 73. When provided with functions other than printing functions, the printers 5 and 7 may possess a copy function, a fax transmission function, and the like.

In the following description, the authentication-method setting information 64 in the printer 5 will be set to the server authentication method while the authentication-method setting information 84 in the printer 7 will be set to the independent authentication method. In this case, the printer 5 is an example of the first printer of the present disclosure, and the CPU 51 and authentication-method setting information 64 are an example of the first switch of the present disclosure. Further, the printer 7 is an example of the second printer of the present disclosure, and the CPU 71 and authentication-method setting information 84 are an example of the second switch of the present disclosure.

A procedure for shared printing can be executed on the printing system 100 according to the present embodiment. In this procedure, the client PC 1 is used to store a print job in the shared folder 45 on the server 3, after which the printer 5 or the printer 7 reads the print job stored on the server 3 and perform a printing operation based on the print job. Next, the shared printing procedure will be described with reference to sequence charts.

Note that the procedures and process steps described below are essentially processes performed by the CPU 11 or the like according to commands described in programs. That is, each process with an action description such as "determine," "extract," "select," "calculate," "set," "identify," "acquire," "receive," and "control" represents a process performed by the CPU. Processes performed by the CPU include hardware control using the API in the OS of the device. However, a description of the role of the OS is omitted in this specification when describing the operations of programs. That is, a description below that indicates "program B controls hardware C" may indicate that "program B controls hardware C using the API of the OS." Further, a process executed by the CPU according to commands in a program may be described using abbreviated expressions, such as "the CPU executes." Similarly, a process executed by the CPU according to commands in a program may be described using expressions that omit the CPU, such as "program A executes."

Note that the term "acquire" in this specification is used as a concept that does not necessarily require a request. In other words, a process by which the CPU receives data without requesting that data is included in the concept of "the CPU acquires data." Further, the term "data" described herein is expressed as bit strings that can be read by a computer. Data of different formats are treated as the same data when the content of the data is essentially the same. The same holds true for "information" in this specification. Further, the terms "requesting" and "instructing" are concepts that denote outputting information to another device indicating a request and an instruction, respectively. Further, information indicating a request and information indicating an instruction will simply be described as a "request" and an "instruction," respectively.

Further, a process performed by the CPU to determine whether information A indicates circumstance B may be described conceptually as "determining whether circumstance B based on information A." A process in which the CPU determines whether information A indicates circumstance B or circumstance C may be described conceptually as "determining whether circumstance B or circumstance C based on information A."

Figure 3:
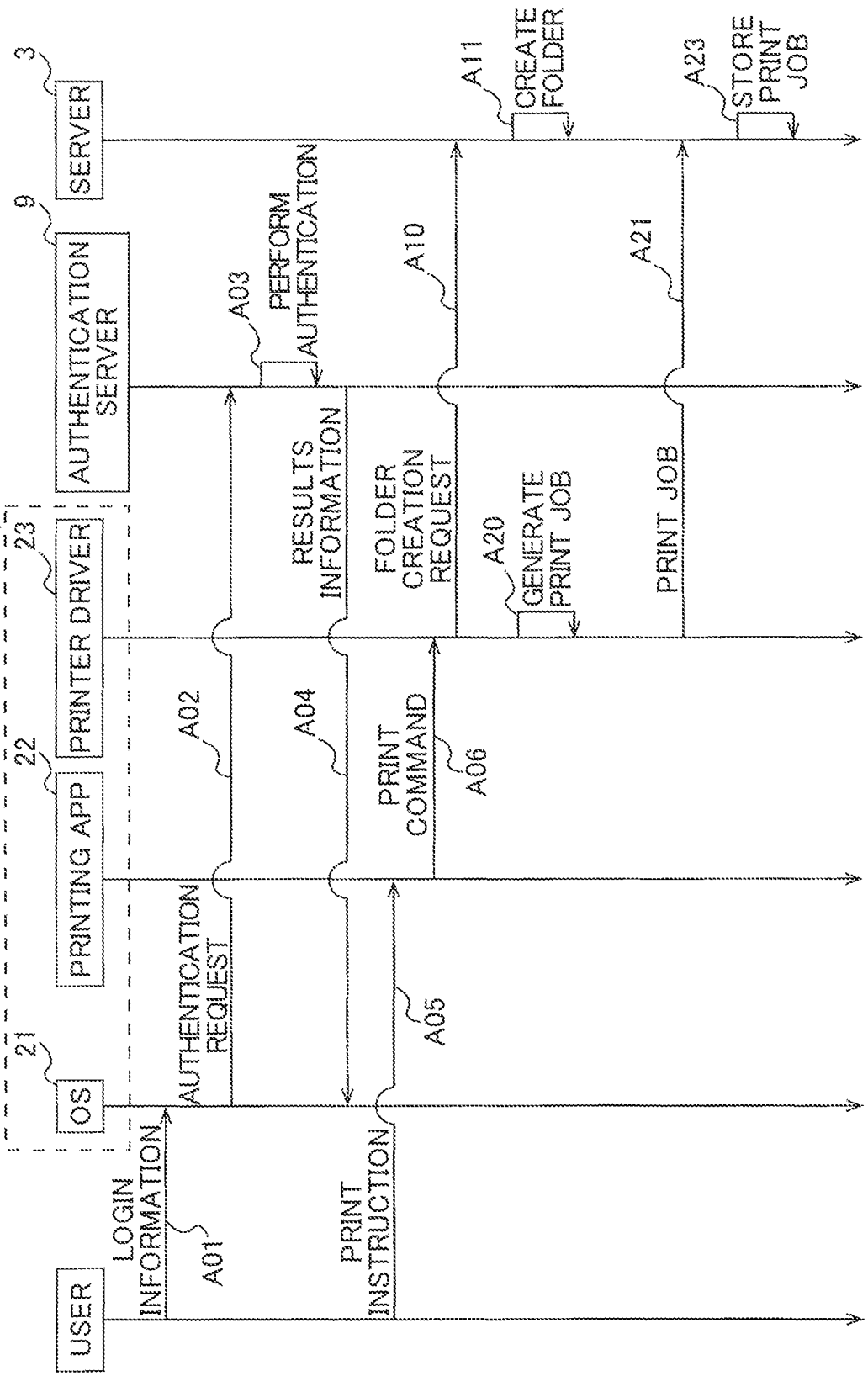
FIG. 3 is a sequence chart illustrating steps in a first procedure executed on the printing system for storing a print job in a shared folder on a server included in the printing system.

First, a first procedure executed on the printing system 100 according to the present embodiment will be described with reference to the sequence chart in FIG. 3. In the first procedure, the client PC 1 is used to store a print job in the shared folder 45 on the server 3.

At the beginning of the first procedure, the user logs in to the client PC 1 (A01). At this time, the user inputs login information via the user interface 13 of the client PC 1. The login information includes a user ID. The client PC 1 in the present embodiment uses the authentication server 9 to authenticate the user according to the server authentication method. Hence, in order to successfully log in to the client PC 1, the user must input login information that has been registered in the authentication management information 91 of the authentication server 9. The login information inputted into the client PC 1 is an example of the first authentication information of the present disclosure. The login information may also be inputted by scanning an ID card, a fingerprint, or a palmprint, for example.

The OS 21 of the client PC 1 transmits the login information received from the user and an authentication request to the authentication server 9 (A02). The authentication server 9 performs authentication based on the login information received from the client PC 1 and the authentication management information 91 (A03) and returns results information indicating the authentication results to the client PC 1 (A04). In other words, the client PC 1 in the present embodiment performs authentication using the server authentication method.

If the login information has been registered in the authentication management information 91, in A04 the authentication server 9 transmits results information to the client PC 1 indicating that authentication has been successful. When the results information indicates that authentication has been successful, the user can use the client PC 1 to issue a print instruction on the printing app 22, for example. If the results information indicates that authentication has failed, on the other hand, the OS 21 displays information indicating that authentication has failed and prompts the user to re-input the login information.

If the results information received from the authentication server 9 indicates that authentication has been successful, the logged-in user, i.e., the user who has succeeded in logging in to the client PC 1, starts up the printing application 22 and inputs a print instruction into the printing app 22 (A05). In the present embodiment, the user specifies either the printer 5 or the printer 7 as the device for executing the printing operation, and the printing app 22 transfers a print command to the printer driver 23 whether the device specified in the print instruction is the printer 5 or the printer 7 (A06). The print command includes image data representing the image to be printed, and parameters related to the printing operation.

The printing app 22 selects the name of a print queue based on a user specification and transfers the name of the selected print queue to the OS 21. Specifically, the printing app 22 selects the name of a print queue in accordance with the device specified in the inputted print instruction. Thus, the OS 21 receives a printer selection indirectly through the name of the print queue. Here, when a printer driver 23 supporting shared printing is installed on the client PC 1, a print queue is created in association with this printer driver 23. The print queue is given a name such as "shared print" to indicate the shared printing function, and this name is provided to the printing app 22 as a printer option. Through this configuration, the OS 21 transfers a print command to the printer driver 23 when "shared print" is selected in the printing app 22. This arrangement makes the printing process more user-friendly since the user need not specify the printer 5 or the printer 7 when issuing a print instruction.

The printer driver 23 transmits a folder creation request to the OS in the server 3 (A10). The folder creation request includes the user ID for the logged-in user on the client PC 1. The printer driver 23 instructs the server 3 to create a folder having a name corresponding to the user ID in the shared folder 45. The user ID is information included in the login information received in A01 and is registered in the authentication management information 91 of the authentication server 9. The folder name assigned to the created folder has a one-on-one correspondence with the user ID. For example, the folder name may be identical to the user ID, a name formed by adding some information to the user ID, or a name formed by modifying the user ID according to a prescribed rule.

Figure 4:
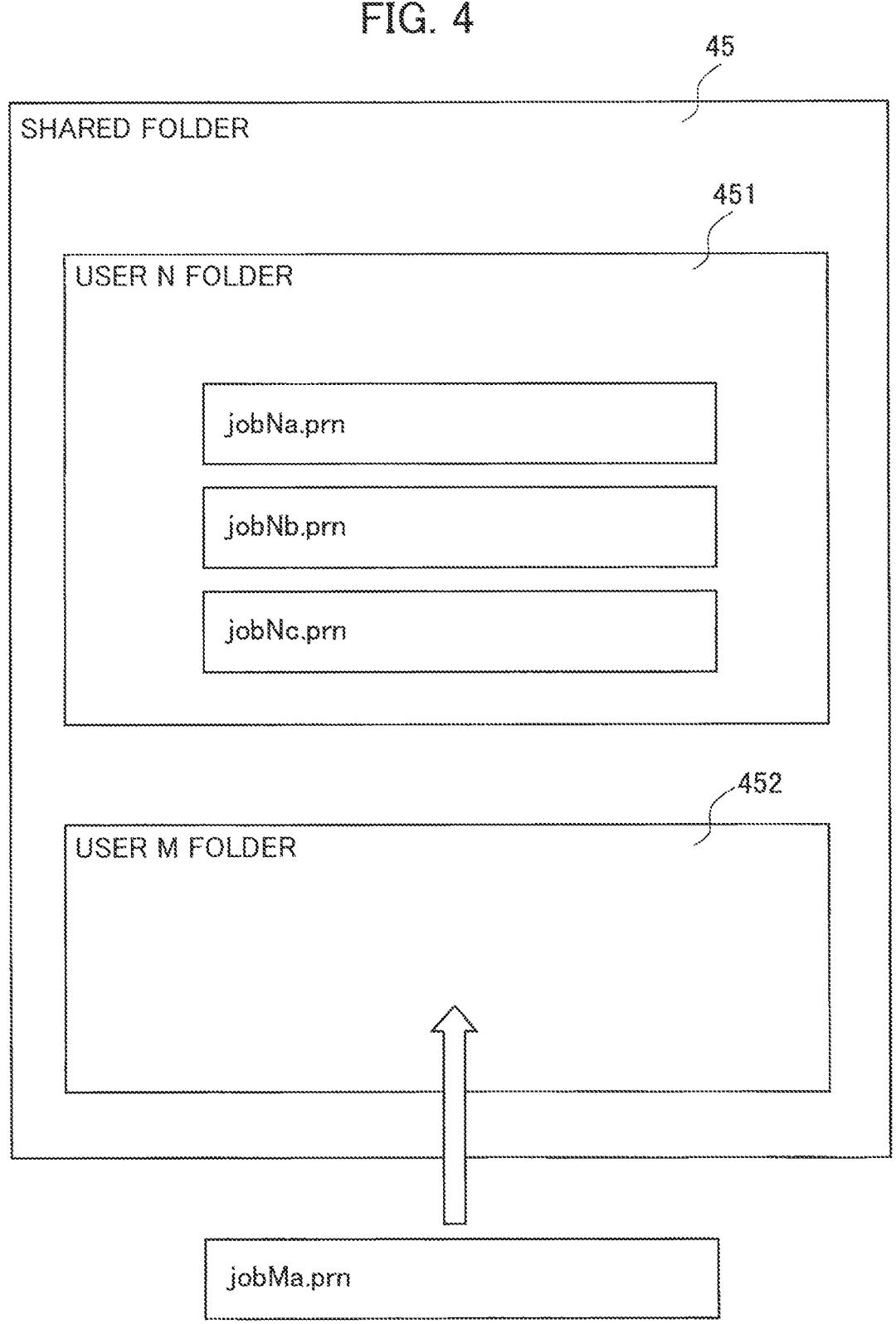
FIG. 4 is an explanatory diagram illustrating an example of the configuration of folders in the shared folder.

When a folder having the specified name does not exist, the OS of the server 3 creates the folder under the shared folder 45 (A11). For example, if the printer driver 23 instructs the creation of a folder for "USER M" in A10, the OS of the server 3 creates the "USER M" folder 452 in the shared folder 45, as illustrated in FIG. 4, provided that a folder having the name "USER M" does not already exist. At this time, the "USER M" folder 452 is empty. If a folder having the specified name already exists in the shared folder 45, on the other hand, the OS of the server 3 skips step A11. A folder having a name corresponding to a user ID is provided in the shared folder 45 on the server 3 for each user ID.

The printer driver 23 generates a print job based on the print command received in A06 (A20). The printer driver 23 transmits the generated print job to the server 3 while designating the folder whose creation has been requested in A10 (A21). Specifically, the printer driver 23 stores the print job in a print queue specifying a shared printer, such as one of the printers 5 and 7, and the OS 21 transmits this print job to the server 3 via the communication IF 14.

Before transmitting a print job to the server 3, the OS 21 includes a PC name with the print job. The PC name is information about the device to which the OS 21 belongs, and in this case is information specifying the client PC 1. Information indicating the current logged-in user on the client PC 1 is assigned to the PC name of the client PC 1. This information may be the user ID included in the login information acquired in A01. The PC name of the client PC 1 is an example of the computer name of the present disclosure. The print job also includes a filename configured of the name of the image that the user specified for printing, i.e., the name of the image data representing the image to be printed.

The server 3 stores the print job received from the client PC 1 in the folder whose name corresponds to the user ID that is specified by the PC name included with the print job (A23). For example, the server 3 stores the print job in the "USER M" folder 452 created in A11. In the example of FIG. 4, the print job "jobMa.prn" created by an instruction from USER M is stored in the "USER M" folder 452.

Note that prior to creating a folder in A11, the server 3 may first confirm whether the user ID is registered on the authentication server 9. In this case, the server 3 may avoid creating a folder having a folder name corresponding to a user ID not registered in the authentication server 9 and storing a print job in that folder.

Further, if the client PC 1 is provided with one printer driver for the printer 5 and another printer driver for the printer 7, for example, in A06 the printing app 22 transfers the print command to the printer driver corresponding to the specified printer. In this case, the server 3 may be instructed to create separate folders for the printer 5 and printer 7 under the shared folder 45.

Figure 5:
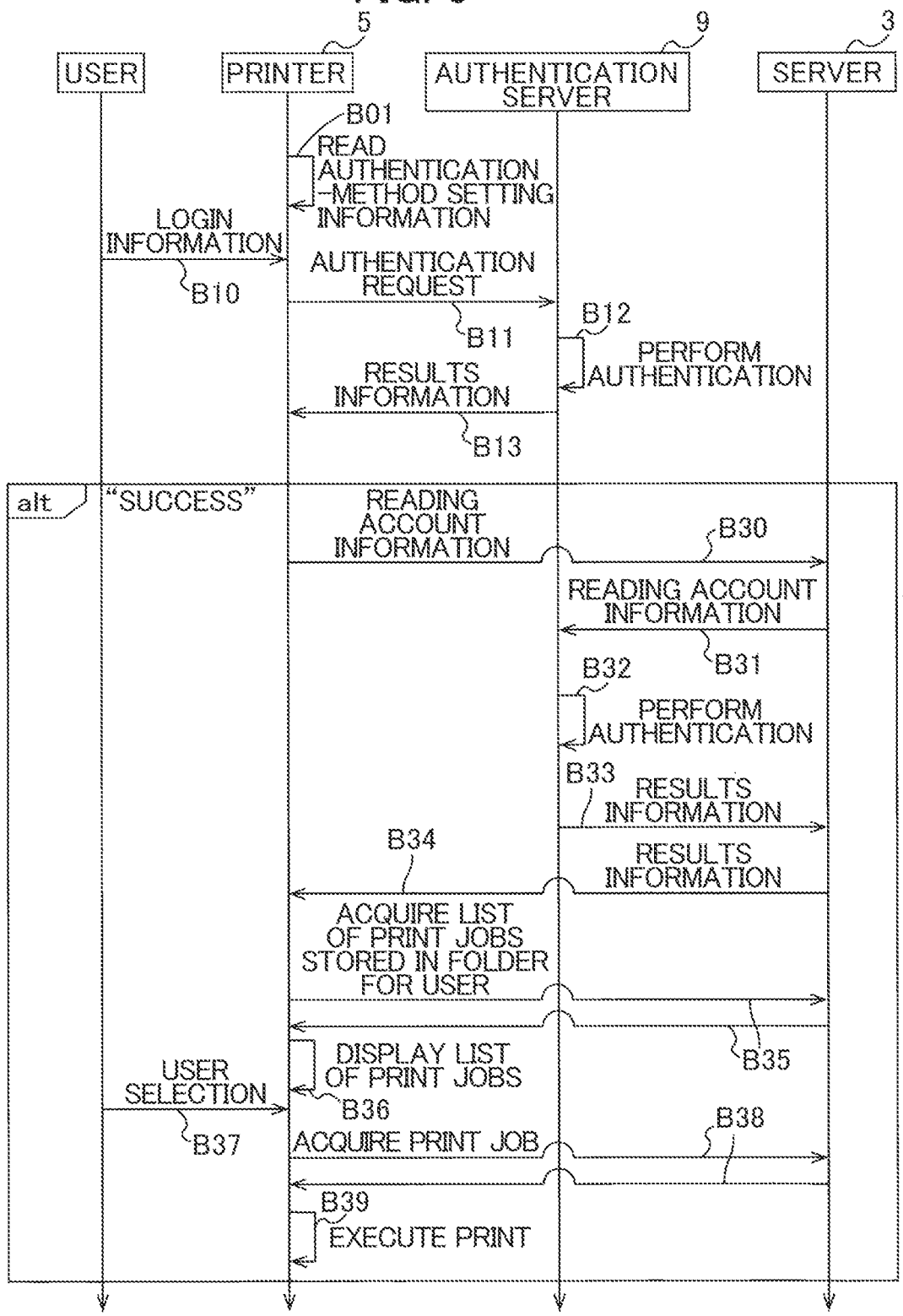
FIG. 5 is a sequence chart illustrating steps in a second procedure executed on the printing system for reading a print job stored on the server and printing the print job on one printer whose authentication method is set to a server authentication method.

Next, a second procedure for reading a print job stored on the server 3 and executing a printing operation based on the print job on the printer 5 or the printer 7 will be described. First, a procedure for using the printer 5 whose authentication method is set to the server authentication method will be described with reference to the sequence chart in FIG. 5. The process performed by the printer 5 in the second procedure is executed by the CPU 51 according to the shared print program 61.

When started up at the beginning of the second procedure, the printer 5 reads the authentication-method setting information 64 (B01). Through this process, the printer 5 sets the authentication method to the server authentication method. The process of B01 is an example of the setting in (h) of the present disclosure. If the authentication-method setting information 64 is switched after start-up, the printer 5 applies this new setting after the printer 5 is restarted. Alternatively, the printer 5 may read the authentication-method setting information 64 at a suitable timing when not executing a printing process or the like.

Subsequently, the user attempts to log in to the printer 5 by inputting login information (B10). The printer 5 transmits the inputted login information and an authentication request to the authentication server 9 (B11). The authentication server 9 performs authentication based on the login information received from the printer 5 and the authentication management information 91 (B12) and transmits results information indicating the authentication results to the printer 5 (B13). The login information received by the printer 5 in B10 is an example of the first authentication information of the present disclosure, and the process from B10 through B13 is an example of the authentication process of the present disclosure. When the results information received from the authentication server 9 indicates that authentication has failed, the printer 5 prompts the user to re-input the login information, for example.

However, when the results information received from the authentication server 9 indicates that authentication has been successful (alt: "success"), the printer 5 requests access to the server 3 by transmitting the reading account information 63 stored in the memory 52 to the server 3 (B30). The server 3 transmits the reading account information 63 received from the printer 5 and an authentication request to the authentication server 9 (B31). The authentication server 9 performs authentication based on the reading account information 63 received from the server 3 and the authentication management information 91 (B32) and transmits results information indicating the authentication results to the server 3 (B33). The server 3 transmits the results information received from the authentication server 9 to the printer 5 (B34).

As described above, the reading account information 63 is information on accounts that have been granted read permission for reading all folders and files stored in the shared folder 45 on the server 3. That is, since the reading account information 63 is successfully authenticated on the authentication server 9, the server 3 receives results information in B14 indicating that authentication has been successful, making the printer 5 successfully authenticated by the authentication server 9. Therefore, the server 3 allows the printer 5 to read print jobs stored in the shared folder 45. By storing the reading account information 63 on the printer 5 in advance, login information can be set with great flexibility, without being limited by permissions for the login information received from the user.

The printer 5 retrieves the folder in the shared folder 45 on the server 3 having a folder name corresponding to the user ID of the logged-in user and acquires a list of the print jobs stored in the retrieved folder (B35). Since the printer 5 can identify the folder name corresponding to the user ID, the printer 5 can retrieve a folder based on the folder name. The printer 5 displays the list of acquired print jobs on the user IF 53 (B36).

The user selects a desired print job to print via the user IF 53 based on the list of print jobs displayed, and the printer 5 receives the user selection (B37). When the folder corresponding to the user contains no print jobs that can be printed, the printer 5 displays a message in B36 indicating that no files are present, and the procedure ends without executing the remaining steps from B37. The desired print job to print is an example of the target print job of the present disclosure.

The printer 5 requests and acquires the selected print job from the server 3 (B38). Note that the printer 5 may itself acquire the specified print job by reading the print job directly from the shared folder 45 on the server 3.

The printer 5 executes a print based on the print job received from the server 3 using the printing engine 55 (B39). The process of B39 is an example of the printing process of the present disclosure. Once printing is complete, the printer 5 deletes the print job received from the server 3. The printer 5 may also transmit an instruction to the server 3 for deleting the print job from the server 3.

Next, the second procedure for the case of using the printer 7 whose authentication method is set to the independent authentication method will be described with reference to the sequence chart in FIG. 6. The process performed by the printer 7 in the second procedure is executed by the CPU 71 according to the shared print program 81. Note that steps in FIG. 6 that are identical to those in FIG. 5, while being executed on a different printer, are designated with the same step numbers.

When started up at the beginning of the second procedure, for example, the printer 7 reads the authentication-method setting information 84 (B01). Through this process, the printer 7 sets the authentication method for authenticating users to the independent authentication method. The process performed by the printer 7 in B01 is also an example of the setting in (h) of the present disclosure.

The user of the printer 7 subsequently inputs login information into the printer 7 (B10). The printer 7 performs user authentication itself based on the login information received from the user, and the authentication information 821 in the user information 82 stored in the memory 72 (B15). The login information received by the printer 7 in B10 is an example of the second authentication information of the present disclosure. In this case the set of B10 and B15 is an example of the authentication process of the present disclosure.

As illustrated in the example of FIG. 2, the user information 82 includes the authentication information 821 and function settings 822. The authentication information 821 is information on users permitted use of the printer 7. For example, the authentication information 821 may be a set of information comprising a user ID and a password. The printer 7 determines that authentication has been successful when the authentication information included in the login information received from the user is registered in the authentication information 821 and allows access to this user. Hence, in order for a user of the printer 7 to log in successfully, the user must input authentication information registered in the user information 82 of the printer 7 rather than authentication information registered on the authentication server 9.

If the printer 7 determines that authentication has been successful (alt: "success"), the printer 7 further determines whether the logged-in user is a sharing user permitted use of the shared printing function according to the function settings 822 of the user information 82 (B20). The function settings 822 are information specifying whether each of various functions is enabled or disabled for each user. Even when user authentication is successful, the user of the printer 7 whose authentication method is set to the independent authentication method can use only those functions that are enabled in the function settings 822 and cannot use functions that are disabled. In FIG. 2, a "○" designates functions that are enabled, while a "X" designates functions that are disabled. In this example, USER B can use the shared printing function and the direct printing function but cannot use the storage printing function. The printer 7 determines in B20 that the logged-in user is a sharing user when the shared printing function is enabled for the user in the function settings 822. The function settings 822 may also include information related to allowable usage counts, such as the number of printable pages, in addition to information indicating whether functions are enabled or disabled.

If the printer 7 determines that the logged-in user is a sharing user (alt: "sharing user"), the printer 7 can accept an instruction for a shared print. If an instruction for a shared print is received, the printer 7 executes a procedure identical to that executed by the printer 5 in FIG. 5 beginning from B30. That is, the printer 7 accesses the server 3 using the reading account information 83 stored in the memory 72 of the printer 7 (B30 through B34) and retrieves the folder having a name corresponding to the user ID received in the login information.

As described above, the user ID included in the authentication information 821 stored in the user information 82 is information common with the user ID received as login information by the client PC 1 in the first procedure, that is, the user ID registered in the authentication server 9. Therefore, the printer 7 can retrieve a folder based on the login information.

The printer 7 acquires and displays a list of the print jobs stored in this retrieved folder (B35 and B36) and accepts a user selection (B37). Subsequently, the printer 7 receives the selected print job from the server 3 (B38) and executes a printing operation based on the print job with the printing engine 75 (B39). In this way, the user can execute a printing operation based on a print job stored in the shared folder 45 on the server 3, even when using the printer 7 that employs a different authentication method.

Since the printer 7 performs login authentication using the user information 82, the printer 7 can permit use by a user not registered in the authentication server 9, provided that the user is registered in the user information 82 and a function other than shared printing has been enabled for that user. Further, since the reading account information 83 is stored on the printer 7 in advance and in addition to the user information 82 used for logging in, login information can be set with great flexibility, without being limited by permissions for the received login information.

Note that the printer 5 and printer 7 may receive selections for a plurality of files from the list of displayed filenames. When the user has selected a plurality of files, the printer 5 or 7 may execute steps B38 and B39 in order for each of the selected files.

In the present embodiment described above, the printing system 100 includes the printer 5 and the client PC 1 whose authentication methods are set to the server authentication method, and the printer 7 whose authentication method is set to the independent authentication method. The client PC 1 performs authentication using the server authentication method and transmits print jobs associated with its own PC name to the server 3. The server 3 stores print jobs received from the client PC 1 in association with the user ID indicated by the PC name. The printer 5 and printer 7 accept inputted login information and, after successfully authenticating the login information using their respective authentication methods, can access the server 3 using the corresponding reading account information 63 and 83 stored on the devices to receive print jobs for the logged-in user. Hence, the information required for user authentication is separate from information for accessing the server 3 on both the printer 5 and the printer 7. Accordingly, the printing system 100 can be configured with a printer 7 having a different authentication method from the client PC 1, thereby enhancing flexibility in system operations.

In the present embodiment, both the client PC 1 and the printer 5 perform authentication using the authentication server 9. Therefore, the user ID associated with a print job stored on the server 3 is the user ID registered in the authentication server 9 and the user ID used for authentication on the printer 5, thereby facilitating the user in using the printer 5.

In the present embodiment, the server 3 creates a folder in the shared folder 45 having a name corresponding to a user ID and stores print jobs in that folder. The printers 5 and 7 then retrieve the folder having a name corresponding to the user ID. Therefore, this method can lighten the processing load since the load required for extracting print jobs in this manner is less than when extracting print jobs for a user from among all print jobs stored in the shared folder 45. Further, since the client PC 1 requests the creation of a folder and specifies that folder as the storage destination for print jobs in the present embodiment, the method of the present embodiment can reduce the processing load on the server 3 by not requiring the server 3 to perform a process for distributing print jobs to prescribed folders.

The embodiment described above is merely an example, and the present disclosure is not intended to be limited by this example. It would be apparent to those skilled in the art that various improvements and modifications may be made to the technology disclosed in this specification without departing from the spirit of the disclosure. For example, the devices in the specification may be of any number and are not limited to the numbers of devices illustrated in the drawings. Further, the client PC is not limited to a PC, but may be a smartphone or tablet computer, for example.

The printers 5 and 7 may be any device having at least a printing function, such as a multifunction peripheral, a copy machine, or a facsimile machine. If the printer 5 or 7 possesses functions other than the shared printing function, the printer 5 or 7 need not require authentication for a user wishing to use a function other than the shared printing function. For example, the printer 5 or 7 may receive a selection for a function to use prior to authentication and may request the user to input authentication information only when receiving an instruction to perform a shared print.

Further, while the printers 5 and 7 in the printing system 100 according to the present embodiment are provided with the authentication-method setting information 64 and 84, respectively, the system may include printers that are not provided with authentication-method setting information. For example, the system may include printers that perform authentication using only the server authentication method and printers that perform authentication using only the independent authentication method. Hence, users have more flexibility for selecting printers.

Further, while the printers 5 and 7 access the server 3 using the corresponding reading account information 63 and 83, the printers 5 and 7 may access the server 3 using the login information received from the user. As when using the reading account information 63 and 83, the printers 5 and 7 can similarly access the server 3 using this login information, provided that the login information is for an account having read permission for reading files and folders from the shared folder 45 on the server 3.

When the independent authentication method has been set in the present embodiment, the printers 5 and 7 determine available functions based on the corresponding user information 62 and 82. However, the printer 5 may determine available functions based on the user information 62 when its authentication method is set to the server authentication method, for example. Alternatively, the results information received from the authentication server 9 may include not only information indicating the results of authentication, but also information indicating available functions for the logged-in user. In this case, the printers 5 and 7 set to the server authentication method may determine whether the logged-in user is a sharing user based on the results information received in B13. Further, the user may be granted use of all functions available on the printers 5 and 7 upon successful login authentication, regardless of whether the printers 5 and 7 uses the server authentication method or the independent authentication method. In this case, the printers 5 and 7 need not include function settings in the corresponding user information 62 and 82.

In the present embodiment, the client PC 1 instructs the server 3 to create a folder for each user under the shared folder 45 and stores print jobs in the folders. However, the client PC 1 need not transmit an instruction to the server 3 for creating a folder, but rather the server 3 may create the folder upon receiving a print job, for example. Specifically, upon receiving a print job, the server 3 may analyze the print job to acquire information on the user ID and may create a folder for the user based on the acquired user ID. Alternatively, the server 3 need not create folders for individual users. That is, the server 3 may simply store all print jobs in the shared folder 45.

In the present embodiment, the client PC 1 itself generates print jobs and transmits these print jobs to the server 3. However, if the server 3 is provided with a program such as a printer driver capable of generating print jobs, the client PC 1 may transmit image data or intermediate data to the server 3 as information for generating print jobs, rather than generating the print jobs itself. Upon receiving the image data or intermediate data, the server 3 may execute a process to generate a print job according to the printer driver or the like provided in the server 3 and may store the generated print job in the shared folder 45.

The printing system may also include a plurality of authentication servers. That is, the client PC 1, the printer 5, and the like may use separate authentication servers to perform authentication. By employing common user IDs, this variation can still implement shared printing on any printer.

In any of the sequence charts disclosed in the embodiment, the plurality of processes that make up any of the plurality of steps may be executed in parallel, or the order in which the processes are performed may be modified in any way that does not produce any inconsistencies in the processes.

The processes disclosed in the embodiment may be executed by a single CPU, a plurality of CPUs, an ASIC or other hardware, or a combination of these components. Further, the processes disclosed in the embodiment may be achieved through a storage medium that stores the programs used to implement those processes or according to any of various other methods or formats.

What is claimed is:

1. A printing system comprising:
a first printer;
a second printer;
a server device configured to communicate with the first printer and the second printer; and
a client device configured to communicate with the server device and comprising a client user interface,
wherein the client device is configured to perform:
(a) in a state where first authentication using first authentication information is successful, transmitting a print job based on an image to be printed to the server device, the print job being associated with a computer name, the first authentication information being received via the client user interface in advance, the first authentication information including user identification information, the first authentication being performed according to a first authentication method, the computer name being assigned to the client device, the computer name including the user identification information,
wherein the server device is configured to perform:
(b) in response to receiving the print job transmitted from the client device in (a), storing the print job in association with the user identification information, the user identification information being specified by the computer name associated with the print job,
wherein the first printer comprises: a first user interface; and a first memory, the first printer being configured to perform:
(c) receiving the first authentication information via the first user interface;
(d) determining whether the first authentication using the first authentication information received in (c) is successful;
(e) accessing, in response to determining in (d) that the first authentication is successful, the server device using first account information stored in the first memory, the first account information being used for accessing the server device with a permission to receive the print job;
(f) receiving, from the server device accessed in (e), the print job stored in association with the user identification information, the user identification information being included in the first authentication information received in (c); and
(g) printing the image based on the print job received in (f), and
wherein the second printer comprises: a second user interface; and a second memory, the second printer being configured to perform:
(h) receiving second authentication information via the second user interface, the second authentication information including the user identification information;
(i) determining whether second authentication using the second authentication information received in (h) is successful, the second authentication being performed according to a second authentication method, the second authentication method being different from the first authentication method;
(j) accessing, in response to determining in (i) that the second authentication is successful, the server device using second account information stored in the second memory, the second account information being used for accessing the server device with the permission to receive the print job;
(k) receiving, from the server device accessed in (j), the print job stored in association with the user identification information, the user identification information being included in the second authentication information received in (h); and
(l) printing the image based on the print job received in (k).

2. The printing system according to claim 1, wherein the client device is configured to further perform:
(m) requesting the first authentication using the first authentication information to an authentication server, the first authentication information being received via the client user interface prior to the (m) requesting,
wherein the transmitting in (a) is performed after the first authentication requested in (m) is determined to be successful, the first authentication being performed for a logged-in user by the authentication server, the computer name including the user identification information for the logged-in user being assigned to the client device, and
wherein the storing in (b) stores the print job in association with the user identification information for the logged-in user, the logged-in user being specified by the computer name associated with the print job.

3. The printing system according to claim 2, wherein the first printer is configured to further perform:
(n) requesting the first authentication using the first authentication information received in (c) to the authentication server, and
wherein the determining in (d) determines whether the first authentication performed by the authentication server is successful, and
wherein the accessing in (e), the receiving in (f), and the printing in (g) are performed in a state where the first authentication using the first authentication information received in (c) is successful.

4. The printing system according to claim 3, wherein the second printer possesses a plurality of functions, the plurality of functions including a specific function, the specific function performing printing based on the print job received from the server device,
- wherein the second memory is configured to store a plurality of function settings for the user identification information, the plurality of function settings corresponding to respective ones of the plurality of functions, each of the plurality of function settings indicating availability of a corresponding one of the plurality of functions, the availability of a function specifying whether the function is enabled or disabled,
- wherein the second printer is configured to further perform:
  - (o) in response to determining in (i) that the second authentication is successful, determining whether the plurality of function settings indicates that the specific function is enabled for specific user identification information, the plurality of function settings being stored in the second memory, the specific user identification information being included in the second authentication information received in (h), and
- wherein, in a case where the determining determines in (o) that the plurality of function settings indicates that the specific function is enabled, the accessing in (j), the receiving in (k), and the printing in (1) are performed.

5. The printing system according to claim 1, wherein the storing in (b) stores the print job in a folder, the folder having a folder name, the folder name corresponding to the user identification information specified by the computer name, the computer name being associated with the print job, the server device being provided with the folder in advance,
- wherein the first printer is configured to further perform:
  - (p) retrieving a first folder having a first folder name on the server device accessed in (e), the first folder name corresponding to first user identification information, the first user identification information being included in the first authentication information received in (c); and
  - (q) receiving a first user selection via the first user interface, the receiving in (f) receiving a first print job stored in the first folder, the first print job corresponding to the first user selection, and
- wherein the second printer is configured to further perform:
  - (r) retrieving a second folder having a second folder name on the server device accessed in (j), the second folder name corresponding to second user identification information, the second user identification information being included in the second authentication information received in (h); and
  - (s) receiving a second user selection via the second user interface, the receiving in (k) receiving a second print job stored in the second folder, the second print job corresponding to the second user selection.

6. The printing system according to claim 5, wherein the client device is configured to further perform:
  - (t) transmitting, to the server device, a creation request of a specific folder having a specific folder name, the specific folder name corresponding to specific user identification information, the specific user identification information being included in the first authentication information received via the client user interface,
- wherein the server device is configured to further perform:
  - (u) creating, in response to receiving the creation request, the specific folder having the specific folder name,
- wherein the transmitting in (a) transmits the print job to the server device while designating the specific folder created in (u) in response to the creation request, and
- wherein the storing in (b) stores the print job received from the server device in the specific folder.

7. The printing system according to claim 1, wherein each of the first account information stored in the first memory and the second account information stored in the second memory is used for authentication according to the first authentication method by the server device,
- wherein the accessing in (e), the receiving in (f), and the printing in (g) are performed with successful authentication performed according to the first authentication method using the first authentication information, and
- wherein the accessing in (j), the receiving in (k), and the printing in (1) are performed with successful authentication performed according to the first authentication method using the second authentication information.

8. The printing system according to claim 1, wherein the first printer further comprises a first switch configured to set an authentication method used in the first printer to one of the first authentication method and the second authentication method,
- wherein the first printer is configured to further perform:
  - (v) receiving the second authentication information via the first user interface; and
  - (w) determining whether the second authentication using the second authentication information received in (v) is successful,
- wherein in a case where the first authentication method is set by the first switch, the receiving in (c) and the determining in (d) are performed, and the accessing in (e) is performed in response to determining in (d) that the first authentication is successful, and
- wherein in a case where the second authentication method is set by the first switch, the receiving in (v) and the determining in (w) are performed, and the accessing in (e) is performed in response to determining in (w) that the second authentication is successful.

9. The printing system according to claim 1, wherein the second printer further comprises a second switch configured to set an authentication method used in the second printer to one of the first authentication method and the second authentication method,
- wherein the second printer is configured to further perform:
  - (x) receiving the first authentication information via the second user interface; and
  - (y) determining whether the first authentication using the first authentication information received in (x) is successful,
- wherein in a case where the first authentication method is set by the second switch, the receiving in (x) and the determining in (y) are performed, and the accessing in (j) is performed in response to determining in (y) that the first authentication is successful, and
- wherein in a case where the second authentication method is set by the second switch, the receiving in (h) and the determining in (i) are performed, and the accessing in (j) is performed in response to determining in (i) that the second authentication is successful.

10. A printer comprising:
a printing engine;
a user interface;
a communication interface;

a memory configured to store account information, the account information being used for accessing a server device with a permission to receive a print job, the server device being configured to receive a user print job from a client device, the user print job being associated with a computer name, the computer name including user identification information, the computer name being assigned to the client device, the server device being configured to store the user print job in association with the user identification information, the user identification information being specified by the computer name associated with the user print job; and a computer configured to perform:
- (a) receiving authentication information including the user identification information via the user interface, the user identification information indicating the current user logged into the client device;
- (b) determining whether an authentication process using the authentication information received in (a) is successful, the authentication process being performed according to a first authentication method;
- (c) accessing, in response to determining in (b) that the authentication process is successful, the server device using the account information stored in the memory;
- (d) displaying, via the user interface, the user print job stored in the server device in association with the user identification information included in the authentication information received in (a);
- (e) receiving a user selection of a target print job to be printed from among the user print job via the user interface;
- (f) receiving, via the communication interface, the target print job based on the user selection received in (e); and
- (g) performing a printing process to control the printing engine to print an image based on the target print job received in (f);

wherein the computer is configured to further perform:
- (h) setting an authentication method to one of the first authentication method and a second authentication method (independent authentication method) different from the first authentication method, wherein the receiving in (a) receives the account information corresponding to the authentication method set in (h), and wherein in the determining in (b), the authentication process is performed according to the authentication method set in (h).

* * * * *